(12) United States Patent
Kake et al.

(10) Patent No.: US 8,049,757 B2
(45) Date of Patent: Nov. 1, 2011

(54) IMAGE PROCESSING DEVICE, IMAGE PROCESSING METHOD AND INFORMATION STORAGE MEDIUM

(75) Inventors: Tomokazu Kake, Tokyo (JP); Yasushi Okumura, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 529 days.

(21) Appl. No.: 11/432,293

(22) Filed: May 11, 2006

(65) Prior Publication Data

US 2006/0256118 A1 Nov. 16, 2006

(30) Foreign Application Priority Data

May 13, 2005 (JP) ................................. 2005-141969

(51) Int. Cl.
*G06T 13/00* (2011.01)
*H04N 5/232* (2006.01)
(52) U.S. Cl. ..................... 345/474; 345/473; 348/14.09; 348/211.11; 348/211.12; 348/211.14
(58) Field of Classification Search .......... 345/473–474; 348/211.11–211.14, 14.09
See application file for complete search history.

(56) References Cited

U.S. PATENT DOCUMENTS

| 5,680,152 A | * | 10/1997 | Bricklin ........................ 345/419 |
| 2003/0038884 A1 | * | 2/2003 | Matsushita et al. ........... 348/212 |
| 2004/0205594 A1 | * | 10/2004 | Arora et al. .................... 715/513 |
| 2005/0021625 A1 | * | 1/2005 | Fujimura et al. .............. 709/204 |
| 2005/0078172 A1 | * | 4/2005 | Harville et al. ............ 348/14.09 |

FOREIGN PATENT DOCUMENTS

| JP | 4-127674 | 4/1992 |
| JP | 3298870 | 4/2002 |
| JP | 2002-218424 | 8/2002 |

OTHER PUBLICATIONS

Notice of Rejection dated Dec. 15, 2009, from the corresponding Japanese Application.

* cited by examiner

*Primary Examiner* — Tize Ma
(74) *Attorney, Agent, or Firm* — Katten Muchin Rosenman LLP

(57) ABSTRACT

To control screen display using moving pictures for a plurality of users.
Respective moving pictures for a plurality of users are acquired, and each of the acquired moving pictures are displayed on a screen.
Display content for the screen is controlled in response to content of each moving picture. At this time, it is also possible to move a specified movement image on the screen according to display position of each moving picture on the screen and content of each moving picture, or to change a display region of the moving picture on the screen according to content of each moving picture.

13 Claims, 10 Drawing Sheets

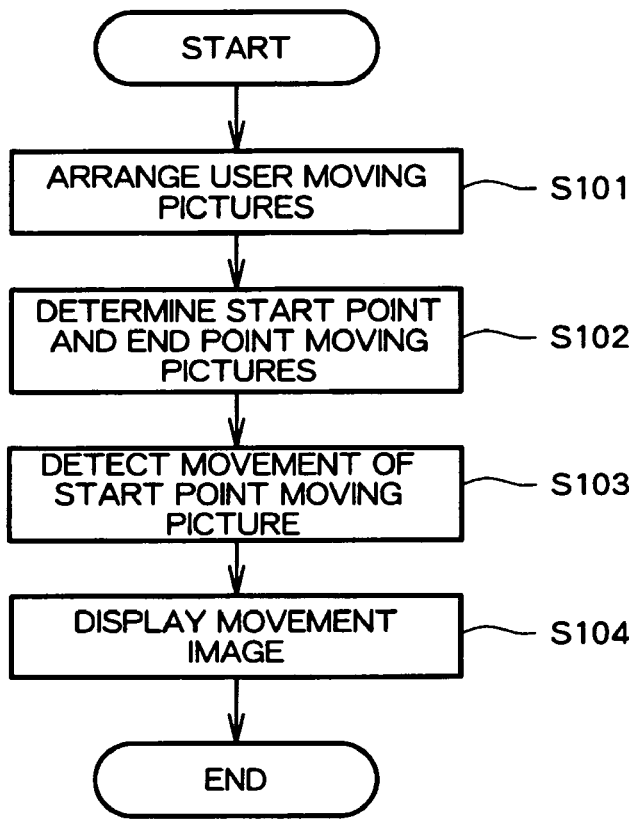
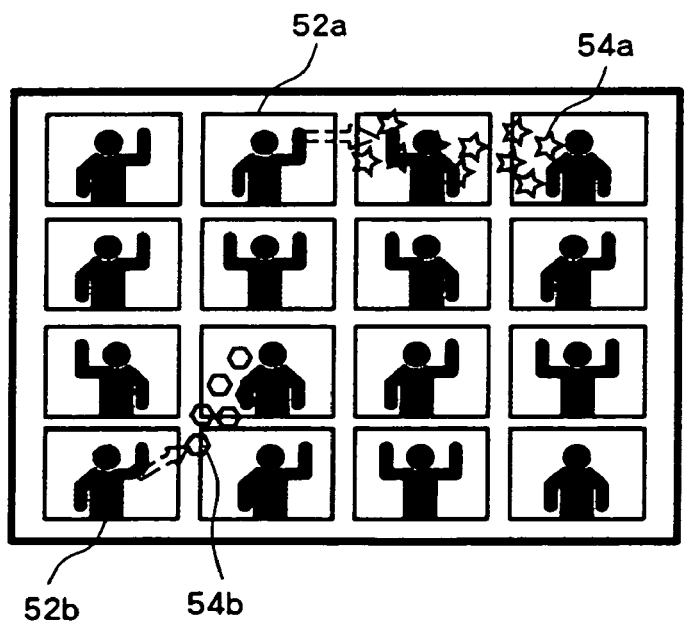

IMAGE PROCESSING DEVICE, IMAGE PROCESSING METHOD AND INFORMATION STORAGE MEDIUM

BACKGROUND OF THE INVENTION

The present invention relates to an image processing device, an image processing method and an information storage medium, and particularly relates to an image processing device, image processing method and information storage medium for displaying images including moving pictures of a plurality of users.

Japanese patent No. 3298870 discloses an image processing device for composing a moving picture of a user in an image formed by a computer, and controlling screen display based on content of the moving image of the user. According to this image processing device, it is possible to direct a user like a character within an image formed by a computer, and it is possible to double the interest level of game software etc.

SUMMARY OF THE INVENTION

With the above-described related art, however, a moving picture for a single user is composed at a fixed position on the screen formed by the computer, and it is not possible to control screen display using moving pictures for a plurality of users. For this reason, there is a problem that it is not possible to utilize such a scheme in a game or simulation using a plurality of users.

The present invention has been conceived in view of the above-described situation, and an object of the invention is to provide an image processing device, image processing method and information storage medium that can control screen display using moving pictures for a plurality of users.

In order to solve the above described problems, an image processing device of the present invention comprises moving picture acquisition means for acquiring respective moving pictures for a plurality of users, moving picture display means for displaying each of the moving pictures acquired by the moving picture acquisition means on a screen, and control means for controlling display content for the screen in response to content of each moving picture.

Also, an image processing method of the present invention comprises a moving picture acquisition step for acquiring respective moving pictures for a plurality of users, a moving picture display step for displaying each of the moving pictures acquired by the moving picture acquisition means on a screen, and a control step for controlling display content for the screen in response to content of each moving picture.

An information storage medium of the present invention stores a program for causing a computer, such as a home game machine, a portable game machine, a personal computer, server computer, portable telephone or portable information terminal, to function as moving picture acquisition means for acquiring respective moving pictures for a plurality of users, moving picture display means for displaying each of the moving pictures acquired by the moving picture acquisition means on a screen, and control means for controlling display content for the screen in response to content of each moving picture. This information storage medium is a computer readable information storage medium such as a DVD-ROM, CD-ROM, or ROM cartridge, etc.

According to the present invention it is possible to control screen display using moving pictures for a plurality of users. For this reason, the invention can be adopted in a game or simulation using a plurality of users.

It is also possible for the control means to move a specified movement image on the screen according to display position of each moving picture on the screen and content of each moving picture. In this way, it becomes possible to direct a simulation between users my means of the movement image.

It is also possible, for example, for the control means to move the movement image with a display position of at least one of the respective moving pictures on the screen as a start point and a display position of at least another one of the moving pictures on the screen as an end point. It then becomes possible to direct communication between a user relating to the start point moving image and a user relating to the end point moving picture.

At this time, it is also possible for the control means to determined a moving picture relating to the start point or the end point based on a random number, or to determine a moving image relating to the start point or end point in accordance with instructions from some or all of a plurality of users.

It is also possible for the control means to determine a moving picture relating to the end point according to content of a moving image relating to the start point (direction of movement or extent of movement of a user projected in the moving picture, for example). In this way, it is possible for a user to determine an end point for the movement image using their own actions.

It is also possible, for example, to determine a moving image relating to the end point from among each of the moving pictures according to amount of variation in each partial region of a moving picture relating to the start point, and position of each partial region of the moving picture. In this way, it is possible for a user relating to a moving picture of the start point to determine an end point using their own actions.

It is also possible for the control means to control the number of the movement images according to amount of variation in the moving picture relating to the start point. In this way, it is possible to show amount of movement of the moving picture, namely movement of the user, using the number of movement images.

It is also possible for the control means to vary a display region for the moving picture on the screen, according to content of each moving picture. In this way, it is possible for users to vary display region for each moving picture using their own actions. As a result, it is possible to have a more interesting system when adopting the invention in an entertainment system such as a game.

In this case, it is also possible for the control means to control display content of the screen according to display region of each moving picture on the screen, and display position of another picture.

For example, it is also possible for the control means to move a display position of the other picture according to display region of each moving picture on the screen. In this way, it becomes possible for a user to move display position of another image by their own actions.

It is also possible for the control means to vary a display region for the moving picture on the screen, according to a position where specific content has been projected in each moving picture. The position where specific content has been projected is the position of a face to be identified using facial recognition technology, for example. In this way, it is possible for a user to arbitrarily deform a display region of a moving picture for every operation, such as varying a position where specific content is displayed.

BRIEF DESCRIPTION OF THE DRAWINGS

FIG. 5 is a flowchart showing image processing for an entertainment system of embodiment 1 of the present invention.

FIG. 6 is a drawing showing a modified example a display screen.

DESCRIPTION OF THE PREFERRED EMBODIMENTS

Embodiments of the present invention will be described in detail in the following based on the drawings.

Embodiment 1

Figure 1:
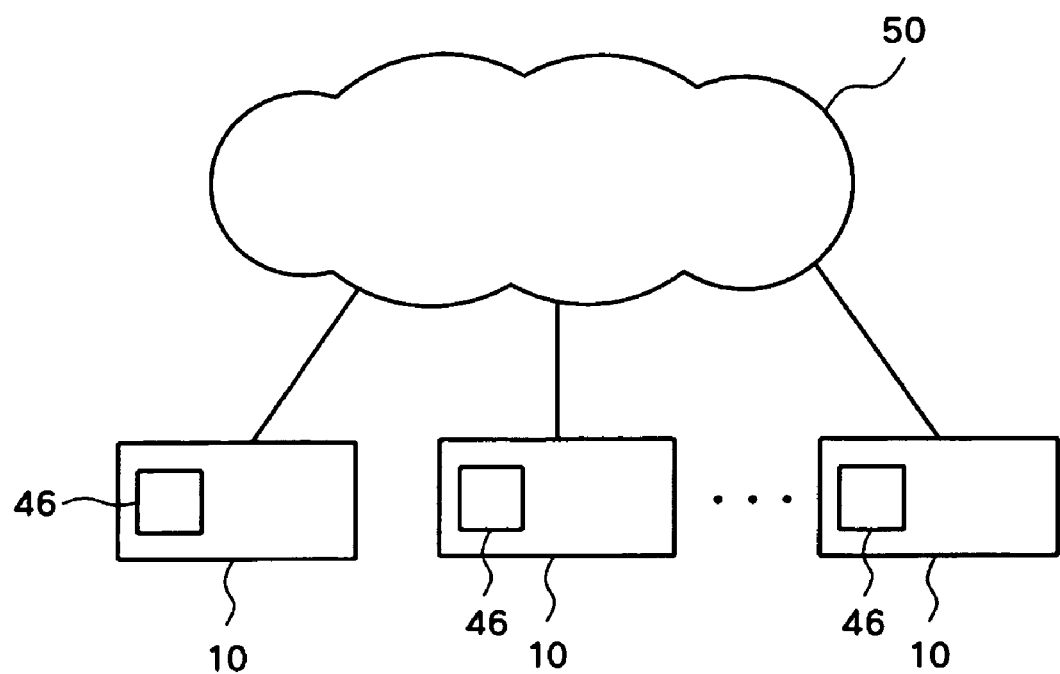
FIG. 1 is a structural diagram of a network system using an entertainment system (image processing device) of an embodiment of the present invention.

FIG. 1 is a structural diagram of a network game machine formed using an entertainment system (image processing device) of this embodiment 1. As show in FIG. 1, this system comprises a plurality of entertainment networks 10 connected to a network 50 such as the Internet or a LAN. Each entertainment network 10 is configured including a computer connected to a camera unit 46 for photographing a moving picture of the user, and is capable of displaying a common image including moving pictures of a plurality of users, of each entertainment system 10, by transferring data representing moving pictures of users via the network 50.

Figure 2:
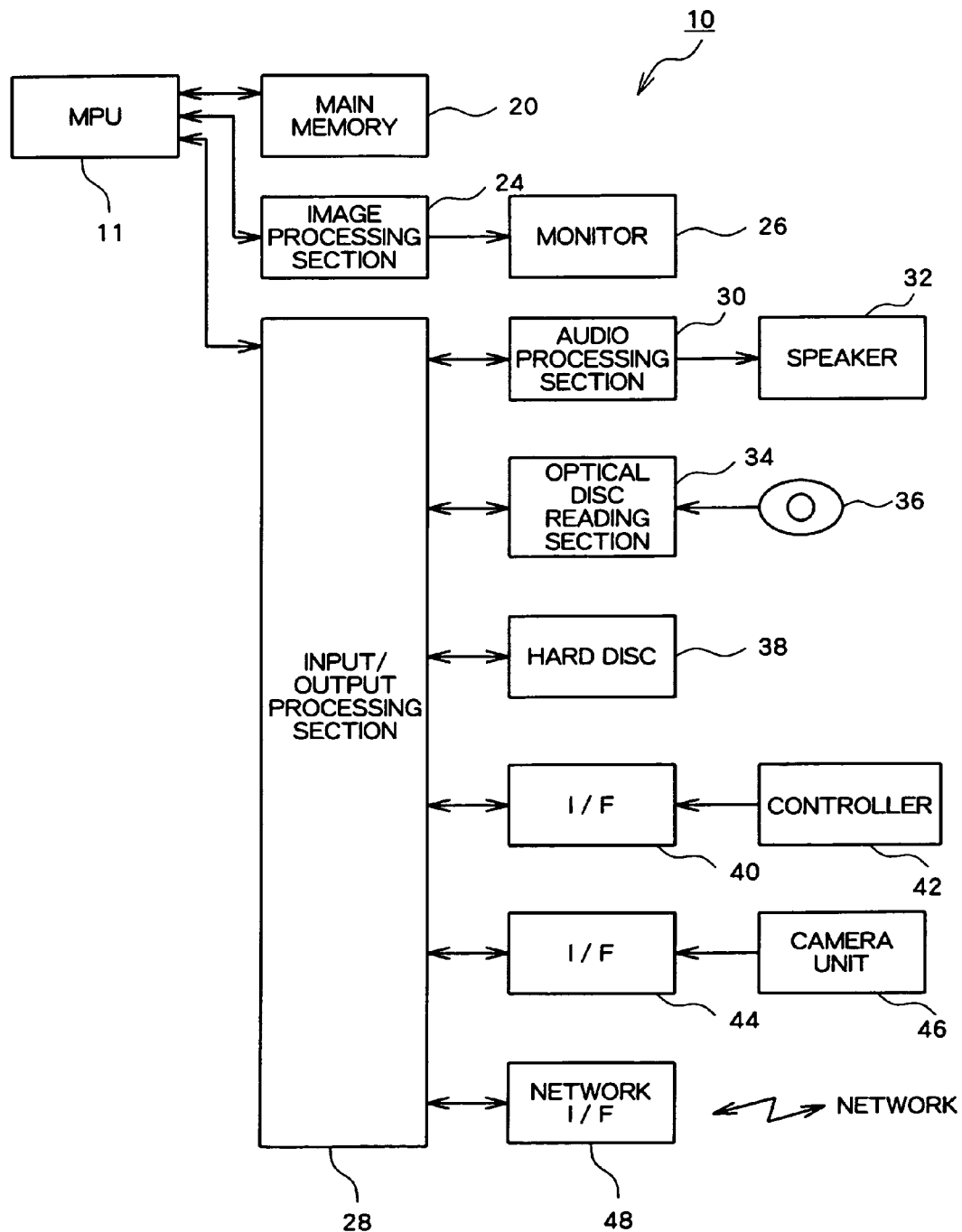
FIG. 2 is a hardware structural diagram of an entertainment system of an embodiment of the present invention.

FIG. 2 is a drawing showing the hardware structure of the entertainment system (image processing device) of this embodiment 1. As shown in FIG. 2, the entertainment system 10 is a computer constructed comprising an MPU (Micro Processing Unit) 11, main memory 20, an image processing section 24, a monitor 26, an input output processing section 28, an audio processing section 30, a speaker 32, an optical disk reading section 34, an optical disk 36, a hard disk 38, interfaces (I/F) 40, 44, a controller 42, a camera unit 46, and a network interface 48.

Figure 3:
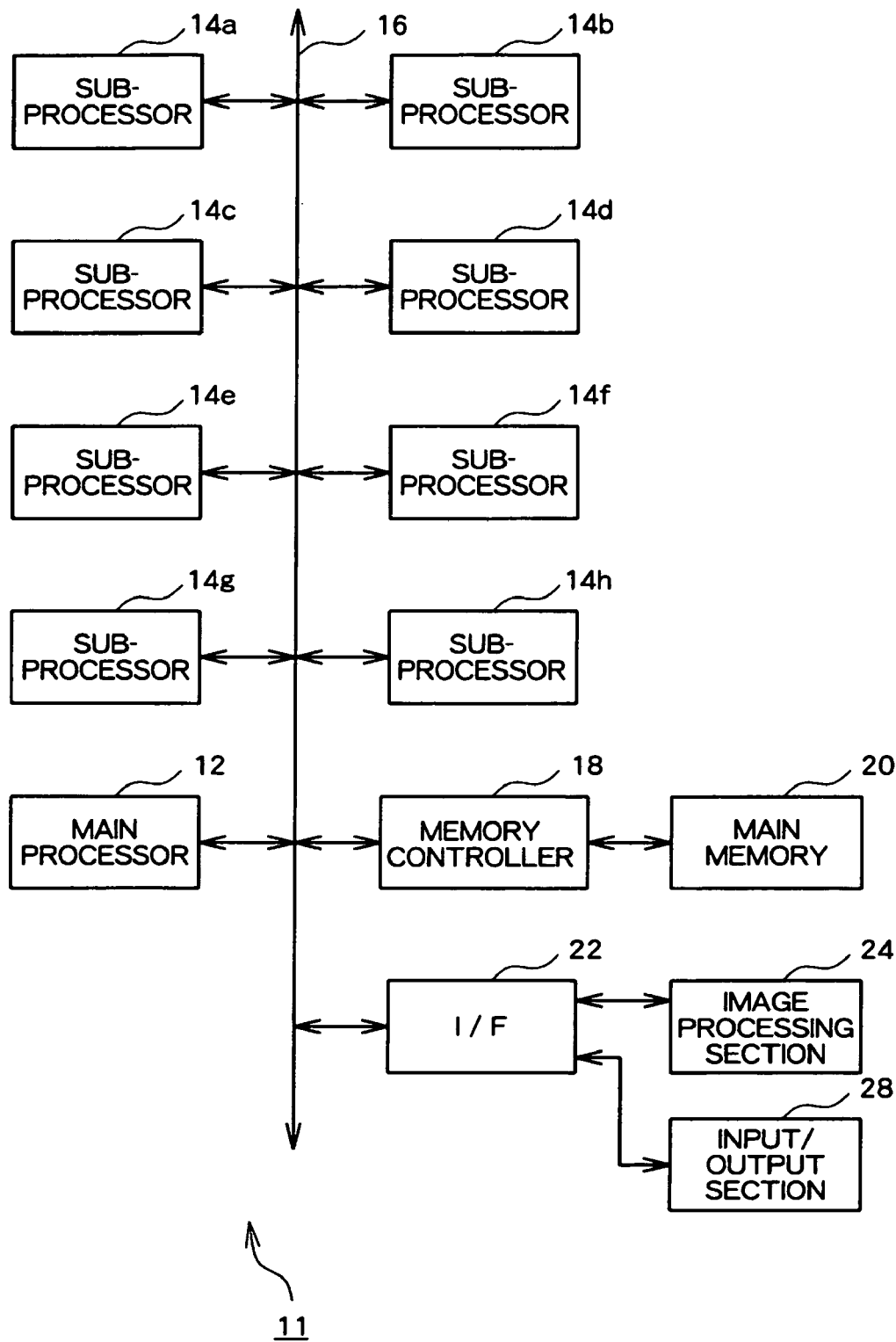
FIG. 3 is an internal structural diagram of an MPU.

FIG. 3 is a drawing showing the structure of the MPU 11. As shown in FIG. 3, the MPU 11 comprises a main processor 12, sub-processors 14a, 14b, 14c, 14d, 14e, 14f, 14g, 14h, a bus 16, a memory controller 18 and an interface (I/F) 22.

The main processor 12 carries out various information processing and performs control for the sub-processors 14a-14h, based on an operating system stored in ROM (Read Only Memory—not shown), for example, programs and data read out from an optical disc 36 such as a DVD (Digital Versatile Disc)-ROM, and programs and data supplied via a communication network.

The sub processors 14a to 14h carry out various information processing in accordance with instructions from the main processor 12, and perform control of each section of the entertainment system 10 based on programs and data read out from an optical disc 36 such as a DVD-ROM, and programs and data supplied via a communication network.

The bus 16 is for exchanging addresses and data with respective sections of the entertainment system 10. The main processor 12, sub-processors 14a to 14h, memory controller 18, and interface 22 are connected to each other by means of the bus 16 capable of exchanging data with each other.

The memory controller 18 performs accesses to the main memory 20 in accordance with instructions from the main processor 12 and sub-processors 14a to 14h.

Programs and data read out from the optical disc 36 and hard disc 38, and programs and data supplied via the communication network, are written into the main memory 20 as required. The main memory 20 is also used as a work area for the main processor 12 and the sub-processors 14a to 14h.

The image processing section 24 and the input/output processing section 28 are connected to the interface 22. Exchange of data between the main processor 12 and the sub-processors 14a to 14h, and the image processing section 24 or the input/output section 28, is carried out via the interface 22.

The image processing section 24 comprises a GPU (Graphical Processing Unit) and a frame buffer. The GPU renders various screens in the frame buffer based on image data supplied from the main processor 12 and the sub-processors 14a to 14h. A screen formed in the frame buffer is converted to video signals at a specified timing and output to the monitor 26. Incidentally, a household television receiver can be used as the monitor 26.

The audio processing section 30, optical disc reading unit 34, hard disc 38 and interfaces 40, 44 are connected to the input/output processing section 28. The input/output processing section 28 control exchange of data between the main processor 12 and sub-processors 14a to 14h, and the audio processing section 30, optical disc reading section 34, hard disc 38, interfaces 40, 44 and the network interface 48.

The audio processing section 30 comprises an SPU (Sound Processing Unit) and a sound buffer. Various audio data such as game music, game effect sounds and messages read out from the optical disc 36 and the hard disc 38 are stored in the sound buffer. The SPU reproduces these various audio data and outputs sounds from the speaker 32. Incidentally, a speaker housed in a household television receiver can be used as the speaker 32.

The optical disc read out 34 reads out programs and data stored in the optical disc 36 in accordance with instructions from the main processor 12 and sub-processors 14a to 14h. It is also possible for the entertainment system 10 to be configured capable of reading out programs and data stored in another information storage medium besides the optical disc 36.

The optical disc 36 is a general optical disc (computer readable information storage medium) such as a DVD-ROM etc. Also, the hard disc 38 is a general hard dick device. Various programs and data are stored in the optical disc 36 and the hard disc 39 capable of being read by a computer.

The interfaces (I/F) 40, 44 are interfaces for connecting various peripheral devices such as the controller 42 and the camera unit 46. It is possible to use a USB (Universal Serial Bus) interface as this type of interface. Incidentally, although omitted from FIG. 1, it is also possible to include in the entertainment system 10 an interface for connecting the entertainment system 10 to a communication network.

The controller 42 is general-purpose operation input means, and is used for a user to input various operations (for example, game operations). The input/output processing section 28 scans the state of each section of the controller 42 every specified time (for example 1/60th of a second) and supplies operation signals representing the result of the scanning to the main processor 12 and the sub-processors 14a to 14h. The main processor 12 and the sub-processors 14a to 14h determine contents of operations performed by the user based on these operation signals. Incidentally, the entertainment system 10 comprises a plurality of connectable controllers 42, and the main processor 12 and the sub-processors 14a to 14h execute various processes based on operation signals input from the respective controllers 42.

The camera unit 46 comprises a well known digital camera, for example, and inputs black and white or color photographed images every specified time (for example, 1/60th of a second). The camera unit 46 of this embodiment inputs the photographed images as image data in JPEG (Joint Photographic Experts Group) format. Also, the camera unit 46 is installed above the monitor 26 in a state with a lens facing towards a player, for example, and is connected to the interface 44 via a specified cable. The network interface 48 is connected to the input/output processing section 28 and the network 50, and relays data communication between the entertainment system and another entertainment system 10 via the network 50.

Figure 4A:
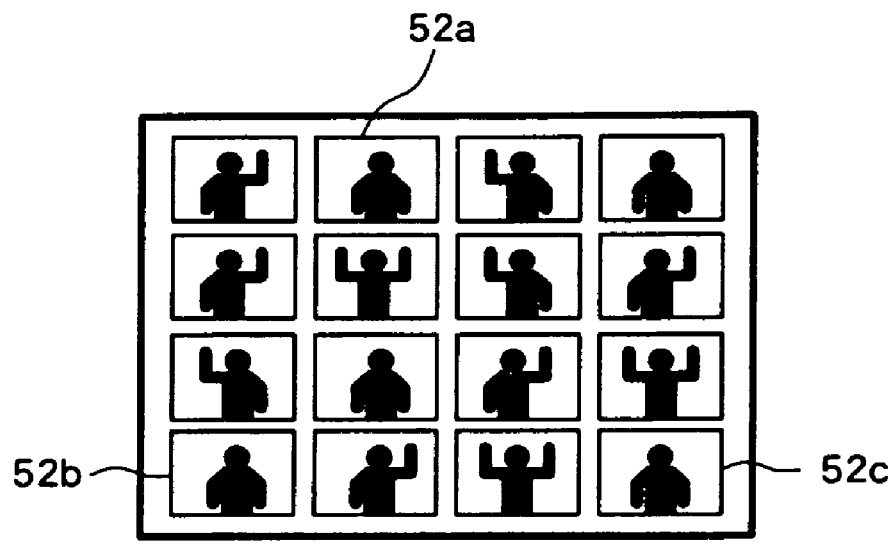
FIG. 4 is a drawing showing one example of a screen projected on a monitor in an entertainment system of embodiment 1 of the present invention.
Figure 4B:
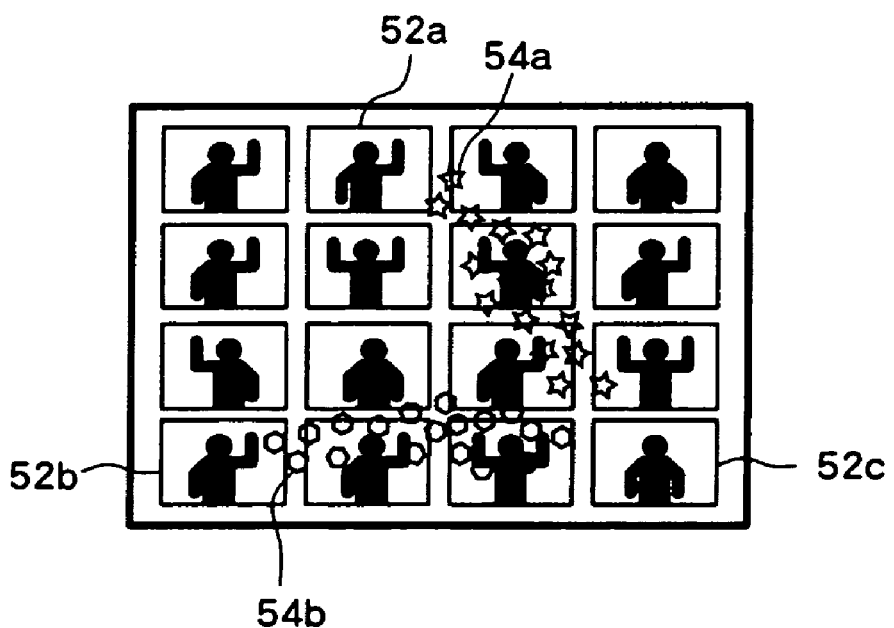

FIG. 4 shows a screen displayed on the monitor 26 in one entertainment system 10 of the this embodiment 1. As shown in FIG. 4A, the screen displayed on the monitor 26 includes moving pictures of other users transmitted from other entertainment systems 10 connected for communication via the network 50, and a moving picture of the user taken by the camera unit 46 connected to the entertainment system 10 together with the monitor 26 (in FIG. 4A, a total of 16 moving pictures). With this embodiment 1, one or a plurality of these plurality of moving pictures are selected as start point moving pictures, and another one or plurality are selected as an end point moving picture. Elements that have selected start point moving pictures 52a, 52b and an end point moving picture 52c are shown in FIG. 4A. The start point moving picture and the end point moving picture can also be selected from among the plurality of moving pictures included on the screen using a random number, or selected according to input of a controller 42 provided in the entertainment system 10 or in another entertainment system 10 connected for communication via the network 50.

After that, if user movement is detected from the content of the start point moving picture, one or more movement images are moved from the display position of the start point moving picture to the display position of the end point moving picture. Here, together with movement of a movement image 54a of a plurality of stars from the start point moving picture 52a to the end point moving picture 52c, a movement image 54b for a plurality of hexagons is moved from the start point moving picture 52b to the end point moving picture 52c.

FIG. 5 is a flow chart showing image processing by the entertainment system 10. The entertainment system 10 receive a moving picture of a user taken by a camera unit 46 provided in another entertainment system 10 in JPEG stream format via the network 50. The received moving picture data in JPEG stream format is converted to raster format by decoding using some of the sub-processors 14a to 14h. The data that has been converted to raster format is stored in the main memory 20. In the above described start point moving image, moving image data is read out from the main memory 20 by another of the sub-processors 14a to 14h, to carry out movement detection processing. With the movement detection processing, difference between frame images at respective timing (for example continuous time frames) for forming moving image data for raster format (is calculated, and a sum for pixel values of this difference image or images derived by subjecting the difference images to appropriate filter processing is calculated. This value represents amount of variation in the start point moving picture (amount of user movement), and this is also stored in the main memory 20.

Using yet another of the sub-processors from among the sub-processors 14a to 14h, a moving picture that has been converted to raster format stored in the main memory 20 is arranged in a screen projected on the monitor 26 (S101). Also, a start point moving picture and an end point moving picture are selected from among a plurality of moving pictures arranged on the screen using a random number, for example (S102).

After that, amount of variation in the start point moving picture calculated by some of the sub-processors 14a to 14h as described above is readout from the main memory 20 (S103). If the readout value exceeds a specified value, the movement images 54a and 54b are displayed on the screen so as to move from the display position of the start point moving picture to the display position of the end point moving picture determined in S102 (S104).

According to the entertainment system 10 of this embodiment 1, it is possible to project onto the monitor 26 an image such as if a message or energy is being sent from a user projected in the start point moving picture to a user projected in the end point moving picture.

Incidentally, movement direction of the endpoint moving picture or movement images 54a and 54b can be determined according to content of the start point moving picture. For example, as shown in FIG. 6, it is possible to move the movement images 54a and 54b n a movement direction of the user of the start point moving picture. In this case, it is possible to select a user moving picture for the movement direction of the movement images 54a and 54b in the end point moving picture.

The direction of movement of the user can be determined by generating a difference image for the start point moving picture (difference image for a frame image at a different timing), based on position of a group of pixels holding a having value exceeding a specified value in the difference image. At this time, it is possible to vary the extent of movement of the movement images 54a and 54b using size of movement of the user, that is, spread in position of pixel sets having pixel values exceeding a specified value in the above-described difference image. If this is done, it becomes possible to move the movement images 54a and 54b quickly by the user moving a hand etc. a large amount. It is also possible to control the number of movement images 54 radiating from the moving picture according to amount of movement of the user shown in the moving picture.

Embodiment 2

Figure 7:
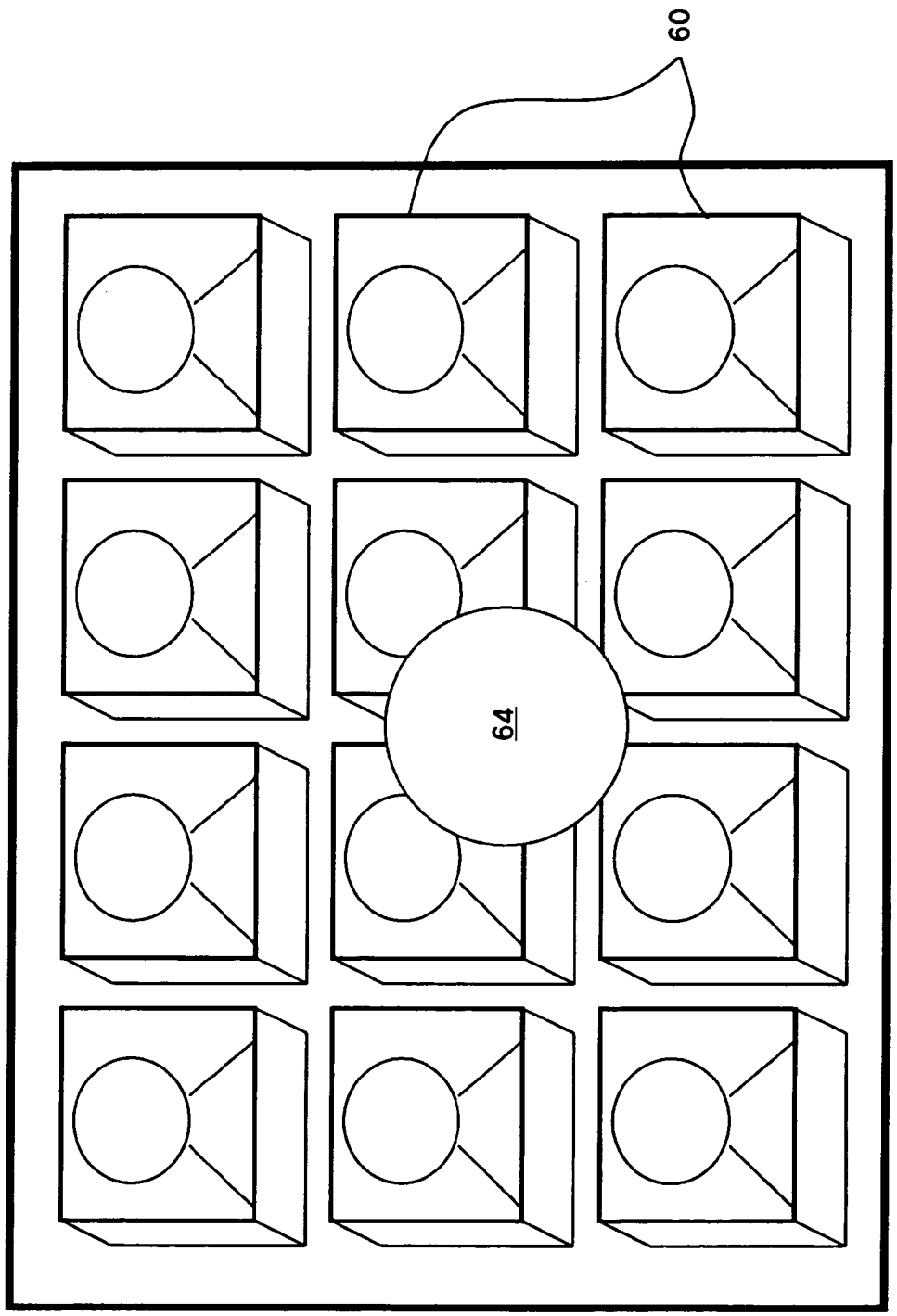
FIG. 7 is a drawing showing one example of a screen projected on a monitor in an entertainment system of embodiment 2 of the present invention.

FIG. 7 shows one example of a screen displayed on the monitor 26 in an entertainment system 10 of this embodiment 2. With the present embodiment 2, and embodiments 3 to 6 that will be described later also, the system structure shown in FIG. 1 to FIG. 3 is adopted, and only a program executed by the MPU 11 and stored in the optical disc 36 is different from embodiment 1.

As shown in FIG. 7, with embodiment 2 a plurality of cubes are displayed on the screen. These cubes are square objects 60 arranged in virtual three dimensional space organized in the main memory 20, and the screen shown in FIG. 7 represents an appearance looking at this virtual three dimensional space from a given viewpoint. On an upper surface of each square object 60, a moving picture of a user transmitted from another entertainment system 10 connected for communication via the network 50 and a moving picture of a user taken using the camera unit 46 connected to the entertainment system 10 together with the monitor 26 for displaying the screen, are applied as texture. Also, spherical globular objects are arranged in the virtual three dimensional space, these globular objects are subjected to parabolic motion in the virtual three dimensional space, and hen the impact with other objects such as the square objects 60 the movement direction is changed.

Figure 8:
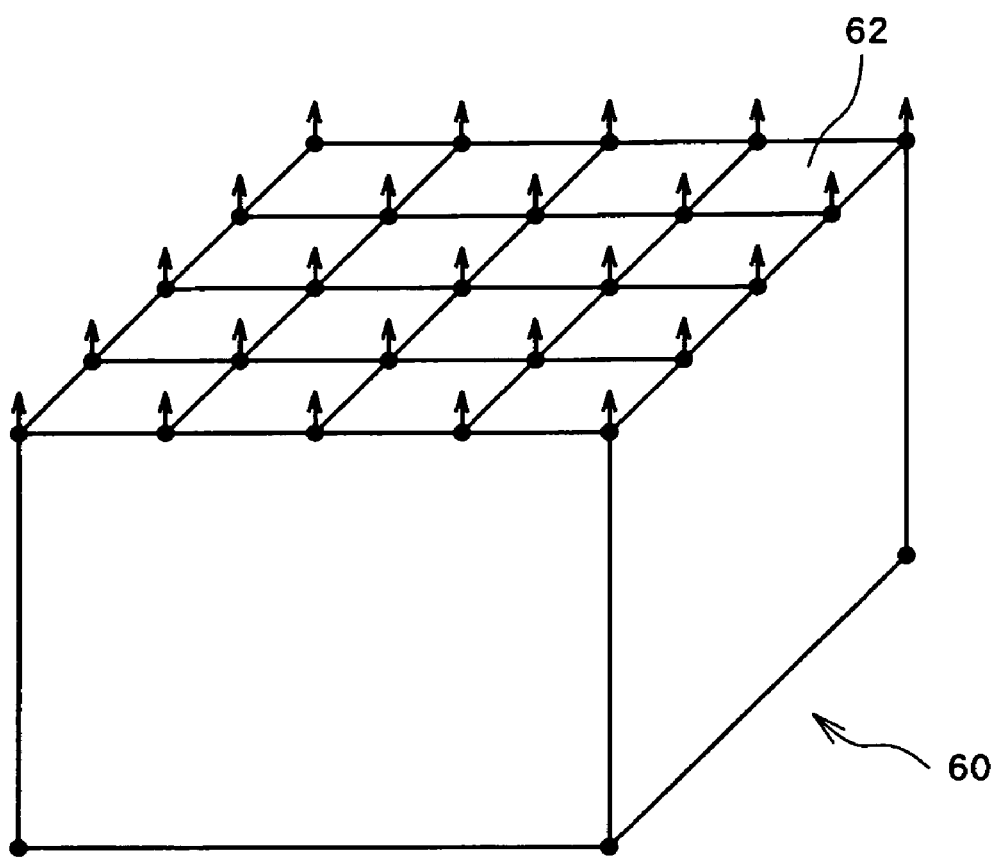
FIG. 8 is a drawing for describing image processing for generating a display screen of embodiment 2.

With this embodiment 2, the user moves in front of the camera unit 46 (for example, moving their hands), to change the content of the moving picture, so as to change the upper surface of the square object 60 having the moving picture applied as texture. Specifically, as shown in FIG. 8, the upper surface of a square object 60 is divided into a plurality of rectangular areas, and a polygon apex is provided in the corner of each rectangular area. Amount of movement of a user portrayed in each rectangular area is calculated based on sections of the rectangular area among difference images of the user moving picture, and polygon apexes placed in corners of regions exhibiting the most movement are moved in a direction away from the square object 60. This movement amount is calculated based on movement of a user projected in a rectangular region, for example. Then, polygon apexes placed in other corners are moved in the same direction by a shorter distance. In this way, the upper surface if a square object 60 having the moving picture of the user applied as texture is changed according to user movement. This change to the square object 60 is calculated in real time, and displayed on the screen.

With this embodiment 2, a rebound direction of a globular object is calculated according to shape of the square object 60, which means that the user can cause the globular object 64 to bounce in any direction by moving in front of their own camera unit 46. It is also preferable to determine speed when the globular object rebounds based on transformation speed of the square object 60.

According to embodiment 2, it is possible for the users themselves to play volleyball using a globular object 64 in virtual three dimensional space by moving in front of respective camera units 46. In this manner, it is possible to significantly increase the interest level when adopted in a game, for example.

Embodiment 3

Figure 9A:
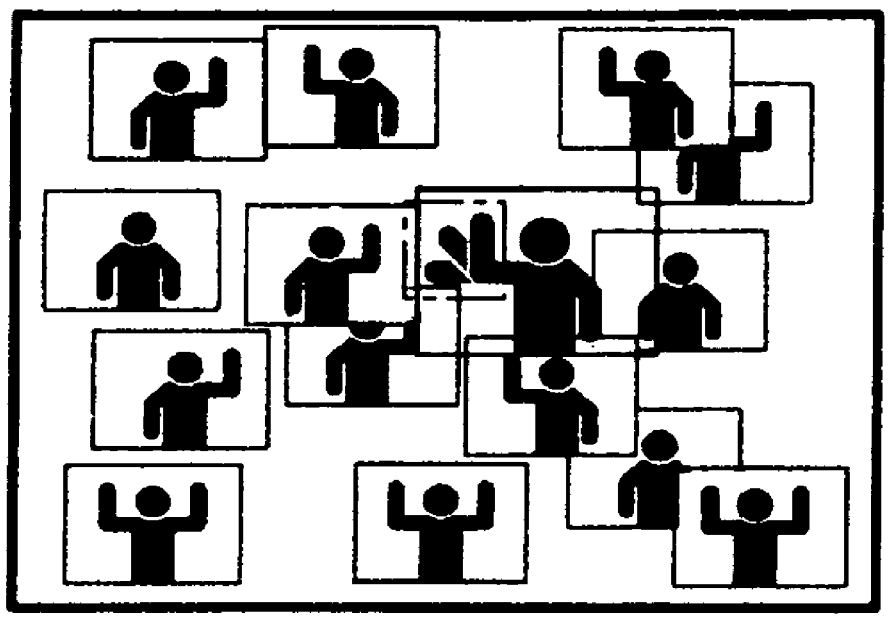
FIG. 9 is a drawing showing one example of a screen projected on a monitor in an entertainment system of embodiment 3 of the present invention.
Figure 9B:
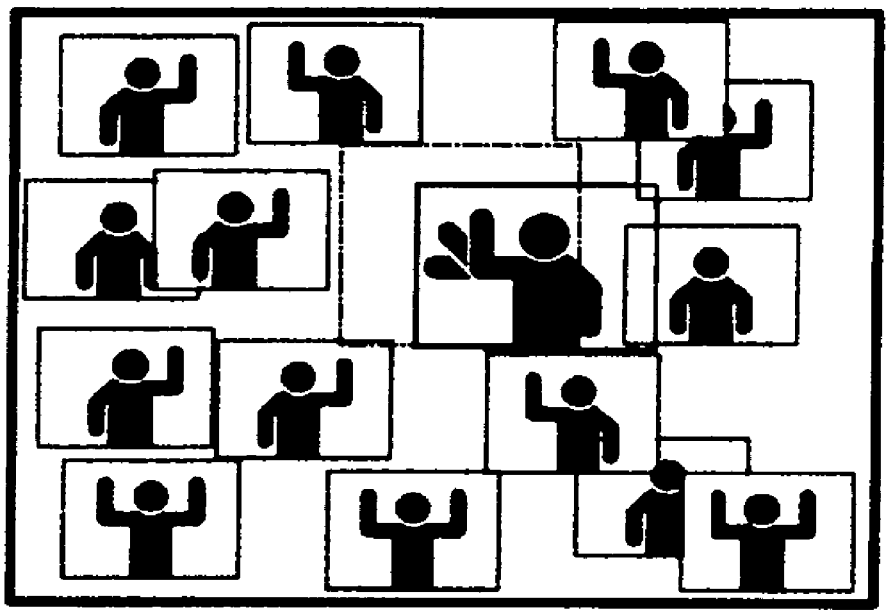

FIG. 9A and FIG. 9B show one example of a screen projected on the monitor 26 in an entertainment system 10 of this embodiment 3. As shown in FIG. 9A, with this embodiment moving pictures of a plurality of users are projected. These moving pictures of users include moving pictures projected by the camera unit 46 connected to the entertainment system 10 together with the monitor 26 for displaying the screen, and moving images received from entertainment systems 10 connected for communication via the network 50.

With this embodiment, as shown in FIG. 9B, if a user moves in front of the camera unit 46, other moving pictures move away from the vicinity of an image region exhibiting that movement. Specifically, the display positions of other moving pictures are moved away from partial regions of the moving picture exhibiting the user movement. In this way also, it is possible for the user to enjoy a game etc. using a screen containing moving pictures of a plurality of users.

Embodiment 4

Figure 10A:
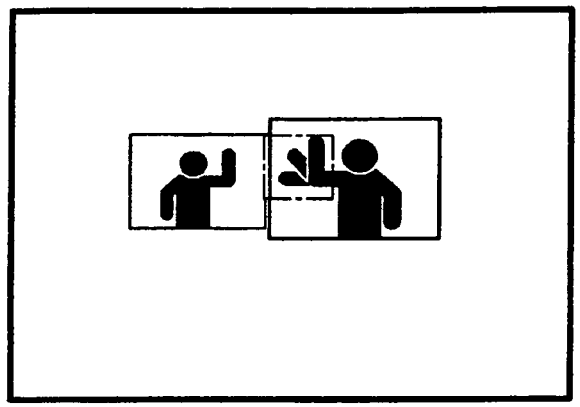
FIG. 10 is a drawing showing one example of a screen projected on a monitor in an entertainment system of embodiment 4 of the present invention.
Figure 10B:
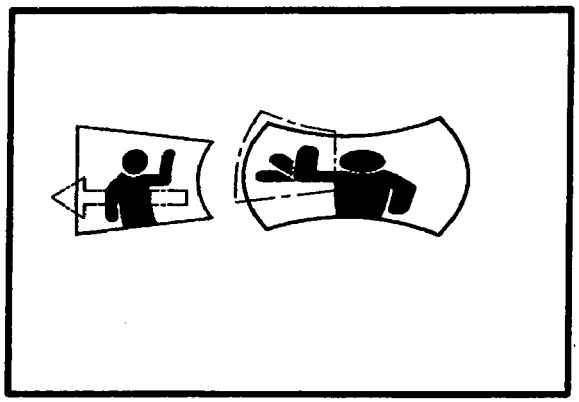

FIG. 10A and FIG. 10B show one example of a screen projected on the monitor 26 in an entertainment system 10 of this embodiment 4. With embodiment 3, display region of a moving picture exhibiting user movement was not changed, but if the user projected in a particular moving picture moves a lot, as shown in FIG. 10A, the display region of the moving picture is changed according to this movement, as shown in FIG. 10B, and it is also possible to flick another moving picture in accordance with that change.

Embodiment 5

Figure 11:
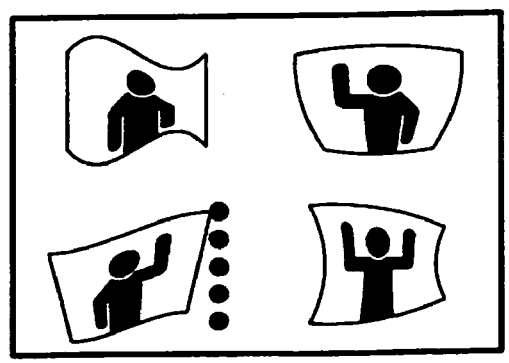
FIG. 11 is a drawing showing one example of a screen projected on a monitor in an entertainment system of embodiment 5 of the present invention.

FIG. 11 shows one example of a screen projected on the monitor 26 in an entertainment system 10 of this embodiment 5. With this embodiment, if the user movement is exhibited in the user moving picture, the display region is changed in response to this movement. Then, if this display region contacts another image displayed on the screen processing corresponding to the image is executed and the screen is updated. For example, it is possible for images of various operating buttons to be displayed on the screen, the user changes a display region of the moving picture by their own movement, and by causing the display region to come into contact with an image of an arbitrary operating button processing corresponding to that operating button is executed and the screen is updated.

Embodiment 6

Figure 12A:
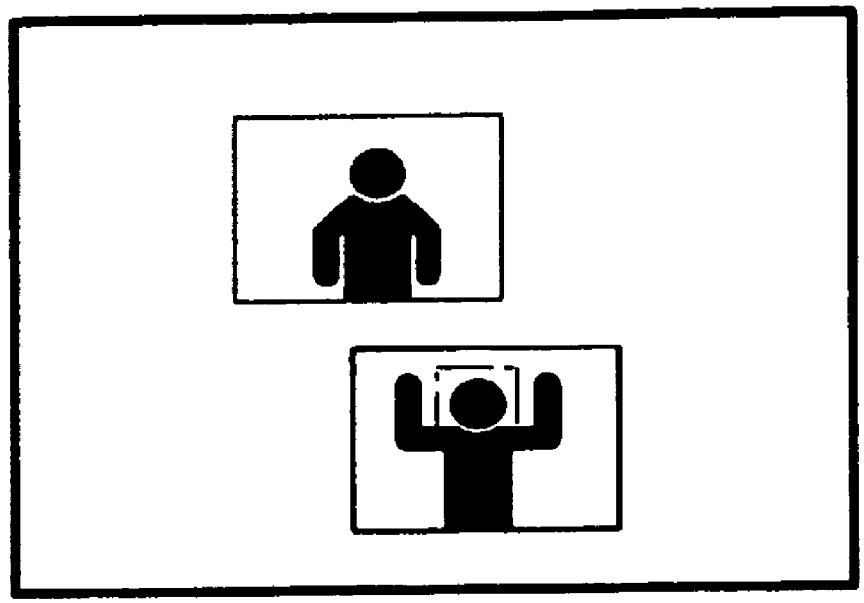
FIG. 12 is a drawing showing one example of a screen projected on a monitor in an entertainment system of embodiment 6 of the present invention.
Figure 12B:
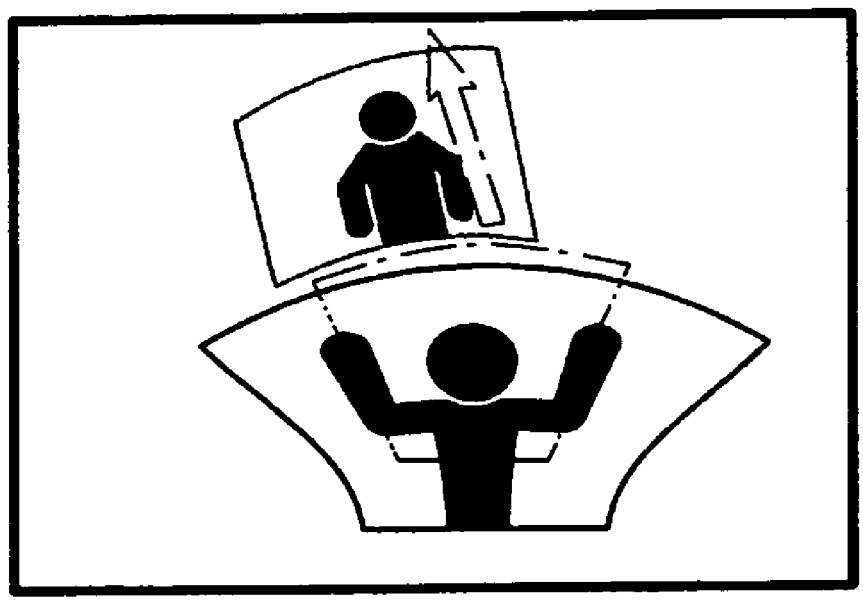

With the above description, display content of a screen projected on the monitor 26 is controlled using user movement exhibited in a moving picture, but as shown in FIG. 12, it is possible to change a display region of a moving picture regarding a position where a body part such as a face within the moving picture, and in this manner change the position of another moving picture.

What is claimed is:
1. An image processing device, comprising:
moving picture acquisition means for acquiring respective moving pictures for a plurality of users;
moving picture display means for displaying each of the moving pictures acquired by the moving picture acquisition means on a screen; and
control means for controlling display content for the screen in response to content of each moving picture, wherein said control means activates a display of at least one movement image that is different from all of the respective moving pictures, and moves the at least one displayed movement image from any one or more of the moving pictures towards another of the moving pictures on the screen when user movement in the content of the one or more moving pictures is detected.
2. The image processing device of claim 1, wherein the control means moves a specified one of the at least one move- ment image on the screen according to display position of each moving picture on the screen and content of each moving picture.

3. The image processing device of claim 2, wherein the control means moves the specified movement image with a display position of at least one of the respective moving pictures on the screen as a start point and a display position of at least another one of the moving pictures on the screen as an end point.

4. The image processing device of claim 3, wherein the control means determines the moving picture relating to the start point or the end point based on a random number.

5. The image processing device of claim 3, wherein the control means determines the moving picture relating to the start point or end point in accordance with instruction from some or all of a plurality of users.

6. The image processing device of claim 3, wherein the control means determines the moving picture relating to the end point according to content of the moving picture relating to the start point.

7. The image processing device of claim 2, wherein the control means controls a number of the movement image according to an amount of variation in the moving picture relating to a start point.

8. The image processing device of claim 1, wherein the control means varies a display region for at least one of the moving pictures on the screen, according to content of the at least one moving picture.

9. The image processing device of claim 8, wherein the control means controls display content of the screen according to display region of each moving picture on the screen, and display position of another picture.

10. The image processing device of claim 9, wherein the control means moves a display position of the other picture according to the display region of each moving picture on the screen.

11. The image processing device of claim 8, wherein the control means varies the display region for the at least one moving picture on the screen, according to a position where specific content has been projected in each moving picture.

12. An image processing method, comprising:
acquiring respective moving pictures for a plurality of users;
displaying each of the moving pictures acquired in the moving picture, acquisition step on a screen;
controlling display content for the screen in response to content of each moving picture; and
displaying at least one movement image that is different from all of the respective moving pictures and moving the at least one displayed movement image from any one or more of the moving pictures towards another of the moving pictures on the screen when user movement in the content of the one or more of the moving pictures is detected.

13. An information storage medium storing a program for causing a computer to function as:
moving picture acquisition means for acquiring respective moving pictures for a plurality of users;
moving picture display means for displaying each of the moving pictures acquired by the moving picture acquisition means on a screen; and
control means for controlling display content for the screen in response to content of each moving picture, wherein
said control means activates a display of at least one movement image that is different from all of the respective moving pictures, and moves the at least one displayed movement image from any one or more of the moving pictures towards another of the moving pictures on the screen when user movement in the content of the one or more of the moving pictures is detected.

* * * * *